(12) United States Patent
Gorvine et al.

(10) Patent No.: US 7,537,230 B1
(45) Date of Patent: May 26, 2009

(54) MOTORIZED TWO WHEELED SCOOTER APPARATUS

(76) Inventors: George Gorvine, 706 Milan St., New Orleans, LA (US) 70115; Leroy Williams, 706 Milan St., New Orleans, LA (US) 70115

( * ) Notice: Subject to any disclaimer, the term of this patent is extended or adjusted under 35 U.S.C. 154(b) by 299 days.

(21) Appl. No.: 11/254,230

(22) Filed: Oct. 18, 2005

Related U.S. Application Data

(60) Provisional application No. 60/619,854, filed on Oct. 18, 2004.

(51) Int. Cl.
*B62K 1/00* (2006.01)
(52) U.S. Cl. .............. 280/274; 280/5.5; 280/281.1; 180/227; 180/219; 180/228
(58) Field of Classification Search ............. 180/225, 180/228, 227, 219; 280/274, 5.5, 281.1
See application file for complete search history.

(56) References Cited

U.S. PATENT DOCUMENTS

| D55,148 S | | 5/1920 | Campling | |
|---|---|---|---|---|
| D124,783 S | | 1/1941 | Salsbury | |
| 4,416,465 A | * | 11/1983 | Winiecki | 280/290 |
| 4,744,579 A | * | 5/1988 | Roatta | 280/275 |
| 5,236,060 A | * | 8/1993 | Huber | 180/210 |
| D342,926 S | | 1/1994 | Russell | |
| 5,433,286 A | * | 7/1995 | Kumamaru et al. | 180/219 |
| D378,996 S | * | 4/1997 | Ysker | D12/110 |
| 5,975,230 A | * | 11/1999 | Bourget | 180/225 |
| 6,446,996 B1 | * | 9/2002 | Horii | 280/281.1 |
| D470,438 S | | 2/2003 | Tateishi et al. | |
| D487,908 S | | 3/2004 | Mayer et al. | |
| 7,195,263 B2 | * | 3/2007 | Ishikawa | 280/219 |

* cited by examiner

*Primary Examiner*—Paul N Dickson
*Assistant Examiner*—Tashiana Adams
(74) *Attorney, Agent, or Firm*—Garvey, Smith, Nehrbass & North, L.L.C.; Seth M. Nehrbass; Charles C. Garvey, Jr.

(57) ABSTRACT

A motorcycle features a frame that includes a center tubing member that has front and rear end portions, a lower part in between the front and rear portions, the center tubing member having an overall length and occupying a plane. A plurality of laterally extending tube sections each have a length that is shorter than the length of the center tubing member, each shorter tube section having first and second ends that are connected to the center tubing member at spaced apart positions. The laterally extending tube sections include a first and a second plurality of shorter tube sections, the first plurality being connected to the center tube at a position in front of the second plurality of the shorter tube sections. A steering assembly includes a front fork, the steering assembly being pivotally attached to the front end portion of the center tube at a provided pivotal connection. A front wheel is carried by the front fork. Handlebars are attached to the steering assembly at a position at the top of the front fork. A rear wheel is connected to the frame behind the lower part of the center tubing member. A shock absorber can extend between the rear wheel and one of the lateral tubes.

45 Claims, 11 Drawing Sheets

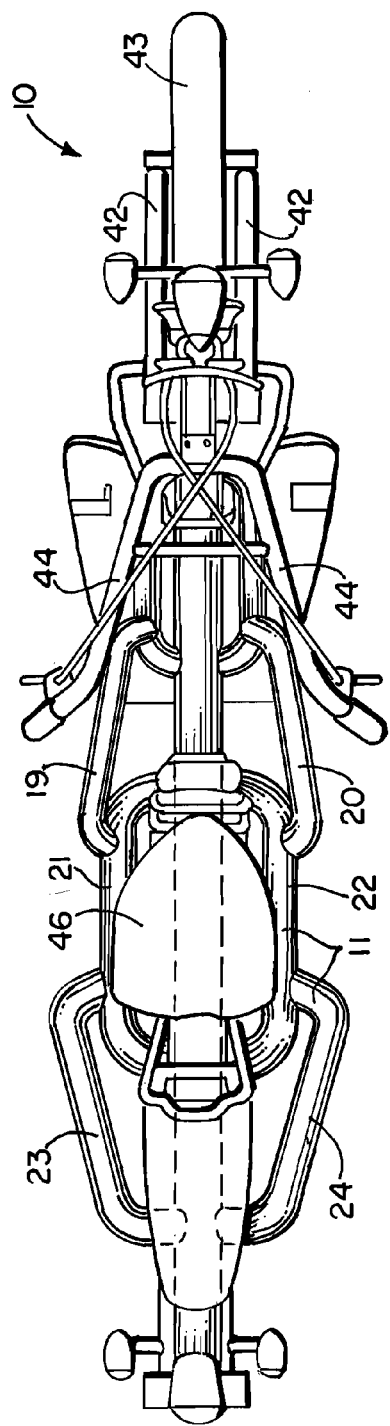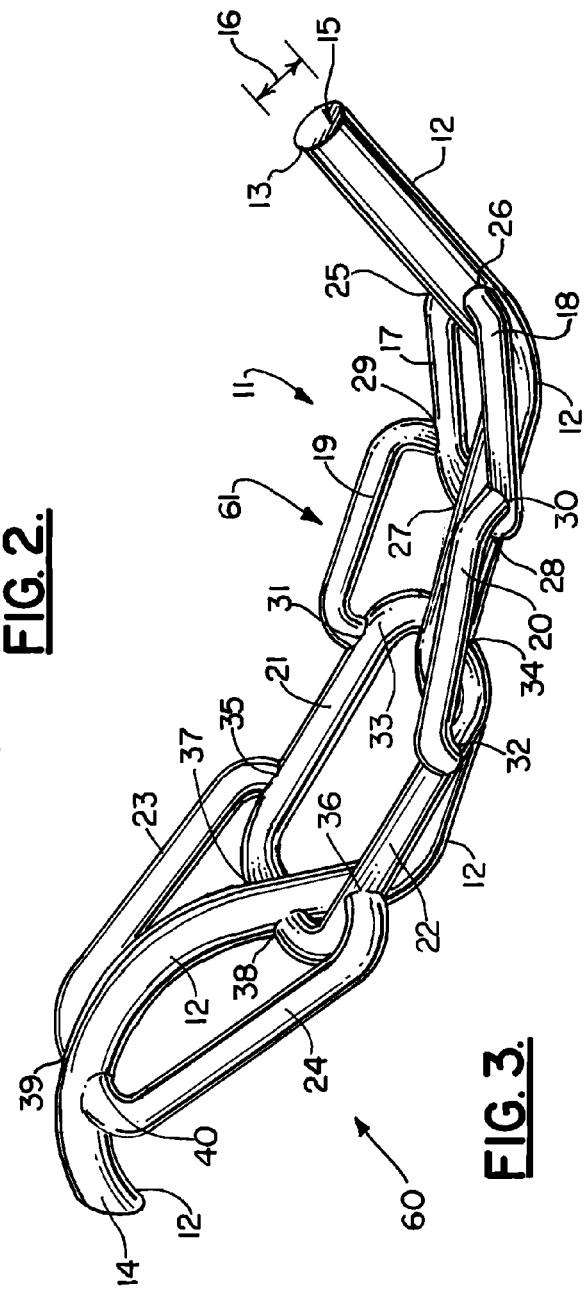

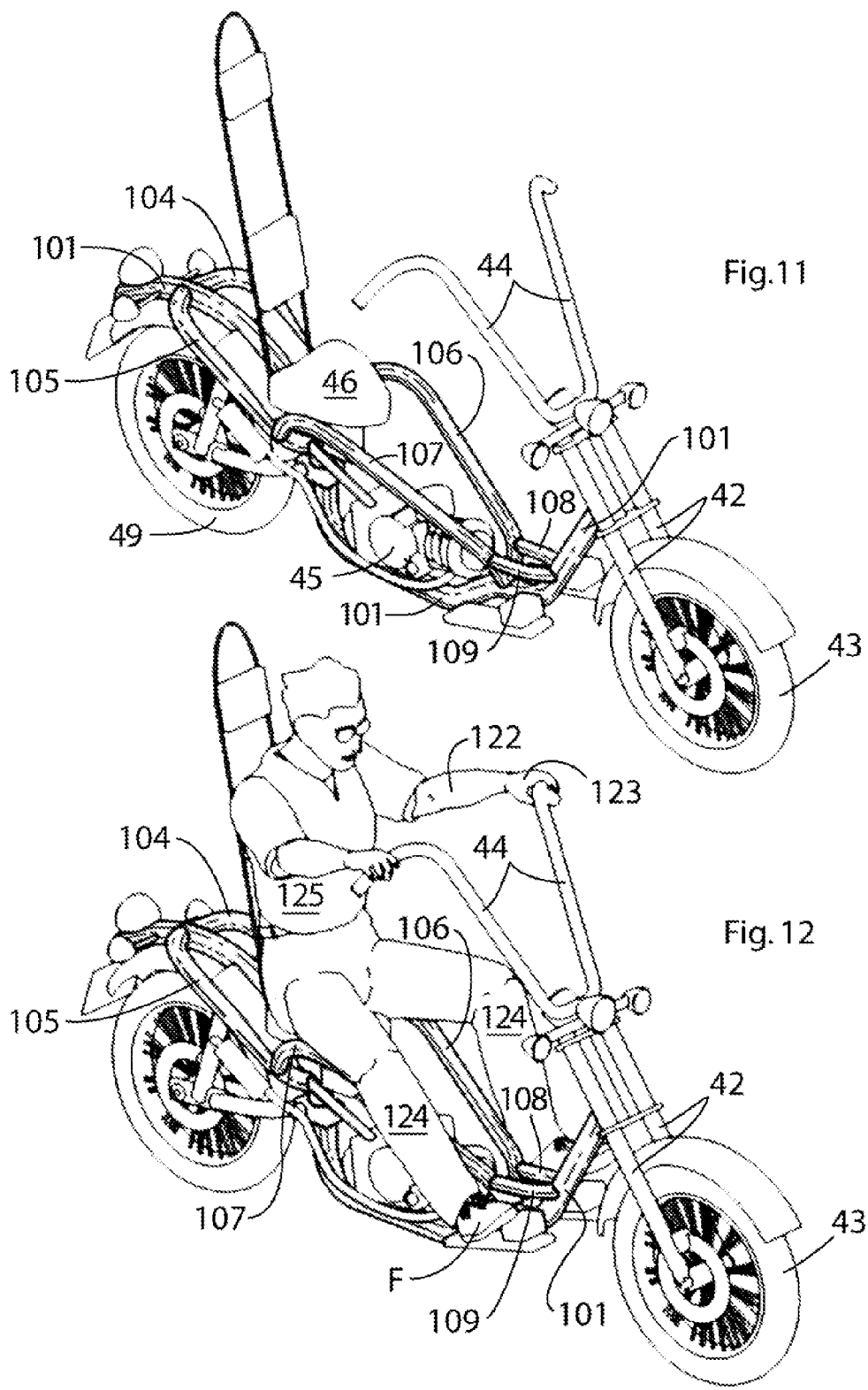

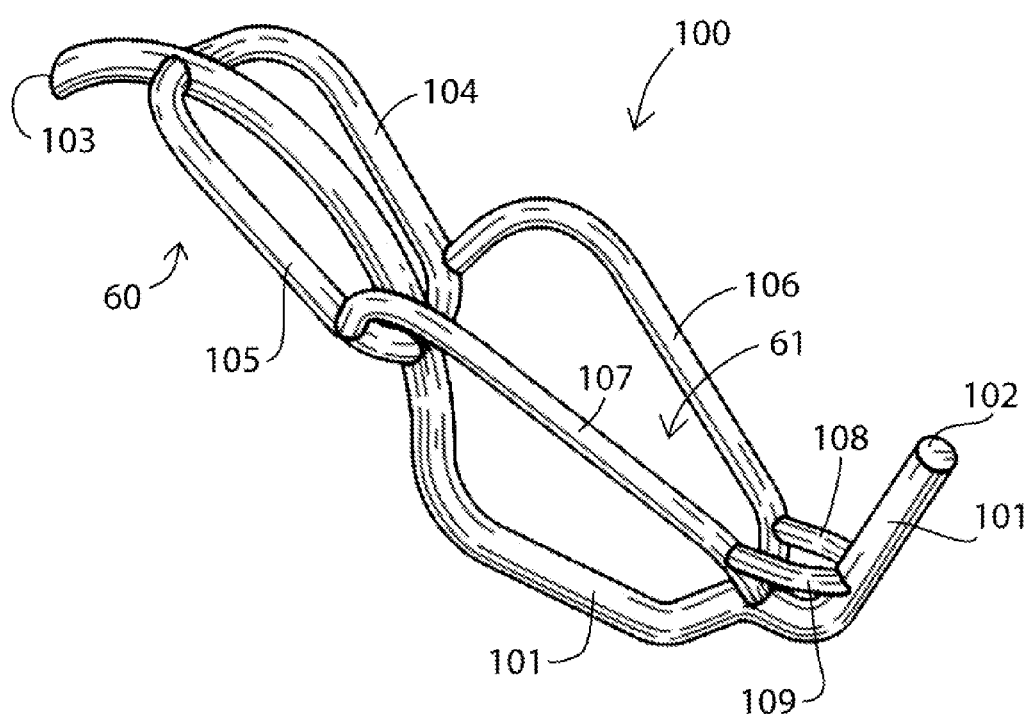

MOTORIZED TWO WHEELED SCOOTER APPARATUS

CROSS-REFERENCE TO RELATED APPLICATIONS

Priority of U.S. Provisional Patent Application Ser. No. 60/619,854, filed Oct. 18, 2004, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to motorcycles and motorcycle frames. More particularly, the present invention relates to an improved motorcycle having a frame that is comprised of a longer elongated center tubing member to which multiple pairs of short tubing sections are attached, each short tubing section being attached (preferably welded) at two positions. More particularly, the present invention relates to an improved motorcycle having an improved frame geometry that provides a single full-length, central, longitudinally extending bent tubing member of larger diameter to which is attached multiple pairs of shorter, preferably smaller diameter laterally extending tubing sections, each attached at two positions to the central tubing member or to a combination of the central tubing member and smaller tubing sections, and wherein components that propel the motorcycle are each protectively nested within a combination of the central tubing member and a pair of smaller diameter laterally extending tubing sections the smaller diameter tubings increasing the overall width of the frame.

2. General Background of the Invention

Motorcycles are well-known and have been manufactured for about a century. Certain motorcycles that have smaller diameter wheels are often referred to as motor scooters or scooters. Several patents have issued for various configurations of motorcycles, scooters and/or motorized bicycles.

The following table is representative of patents issued for various motorcycle designs.

TABLE 1

| PATENT NUMBER | TITLE | INVENTOR |
|---|---|---|
| D124,783 | Motor Vehicle | Salsbury |
| D342,926 | Motorized Bicycle | Russell |
| D425,454 | Motorized Skate Board With Seat | Gorvine et al. |
| D433,654 | Motorized Skate Board With Seat and Footrests | Gorvine et al. |
| D441,323 | Electric Vehicle | Cheng |
| D470,438 | Motor Scooter | Tateishi et al. |
| D487,908 | Low Rider Scooter | Mayer et al. |

Prior U.S. Pat. Nos. D-425,454 and D-433,654 show a frame that allows a person to step through rather than over the vehicle frame to sit. The motor is on the side of the seat.

Patent D-470,438 discloses a motorized scooter with a seat, note the front view in FIG. 4.

Patents D-55,148 and D-124,783 show motor scooters with step on platforms and a seat with a motor behind the seat and with pedals at the front of the platform.

Patents D-487,908 and D-441,323 show other platform type scooters.

A frame design for a motorized bicycle is seen in Design Pat. D-342,926.

BRIEF SUMMARY OF THE INVENTION

The present invention provides an improved motorcycle that features a frame that includes a center tubing member that has front and rear end portions, a lower part in between the front and rear portions, the center tubing member having an overall length and occupying a plane.

A plurality of laterally extending tube sections each have a length that is shorter than the length of the center tubing member, each shorter tube section having first and second ends that are connected to the center tubing member at spaced apart positions.

The laterally extending tube sections include a first and a second plurality of shorter tube sections, the first plurality being connected to the center tube at a position in front of the second plurality of the shorter tube sections.

A steering assembly includes a front fork, the steering assembly being pivotally attached to the front end portion of the center tube at a provided pivotal connection.

A front wheel is carried by the front fork. Handlebars are attached to the steering assembly at a position at the top of the front fork. A rear wheel is connected to the frame behind the lower part of the center tubing member.

A shock absorber can extend between the rear wheel and one of the lateral tubes.

The frame supports a plurality of components that include an engine that sits atop the lower part of the center tube, a seat that is supported by the frame at a position next to the rear end portion of the center tube, and a fuel tank for supplying fuel to the engine.

The present invention is a unique amalgam, a hybrid combining the best qualities of the motor scooter and the motorcycle. The present invention provides a superior street scooter with a street speed of up to 70 mph that has the safety features of the motorcycle.

Unlike a scooter, the present invention's frame preferably features the many "motorcycle-like" attributes. It can be provided with larger diameter (e.g. 16-inch) wheels. It can provide a motorcycle like front fork rake angle (e.g. 42 degrees). Other motorcycle-like features that can be used with the present invention include a wishbone rear swing arm; one or two rear shocks; air-cooled motor (for example, a 250 cc, four-cycle engine); a five-speed automatic transmission; an adjustable sliding seat; handlebar angle adjustments; adjustable pedal controls; brake and gear shift levers; an adjustable headrest; enhanced stability due to large wheels; and full travel suspension.

Unlike a motorcycle, the present invention features step through mounting and dismounting.

A motorcycle features a frame that includes a center tubing member that has front and rear end portions, a lower part in between the front and rear portions, the center tubing member having an overall length and occupying a plane. A plurality of laterally extending tube sections each have a length that is shorter than the length of the center tubing member, each shorter tube section having first and second ends that are connected to the center tubing member at spaced apart positions. The laterally extending tube sections include a first and a second plurality of shorter tube sections, the first plurality being connected to the center tube at a position in front of the second plurality of the shorter tube sections. A steering assembly includes a front fork, the steering assembly being pivotally attached to the front end portion of the center tube at a provided pivotal connection. A front wheel is carried by the front fork. Handlebars are attached to the steering assembly at a position at the top of the front fork. A rear wheel is connected to the frame behind the lower part of the center tubing member. A shock absorber can extend between the rear wheel and one of the lateral tubes. The frame supports a plurality of components that include an engine that sits atop the lower part of the center tube, a seat that is supported by the frame at a position next to the rear end portion of the center tube, and a fuel tank for supplying fuel to the engine.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a top view of a preferred embodiment of the apparatus of the present invention;

FIG. 3 is a partial perspective view of the preferred embodiment of the apparatus of the present invention;

FIG. 11 is a perspective view of an alternate embodiment of the apparatus of the present invention utilizing the frame of FIGS. 7 and 8;

FIG. 12 is a perspective view of an alternate embodiment of the apparatus of the present invention utilizing the frame of FIGS. 7 and 8;

FIG. 13 is a fragmentary perspective view of an alternate embodiment of the apparatus of the present invention, showing the frame;

DETAILED DESCRIPTION OF THE INVENTION

Figure 1:
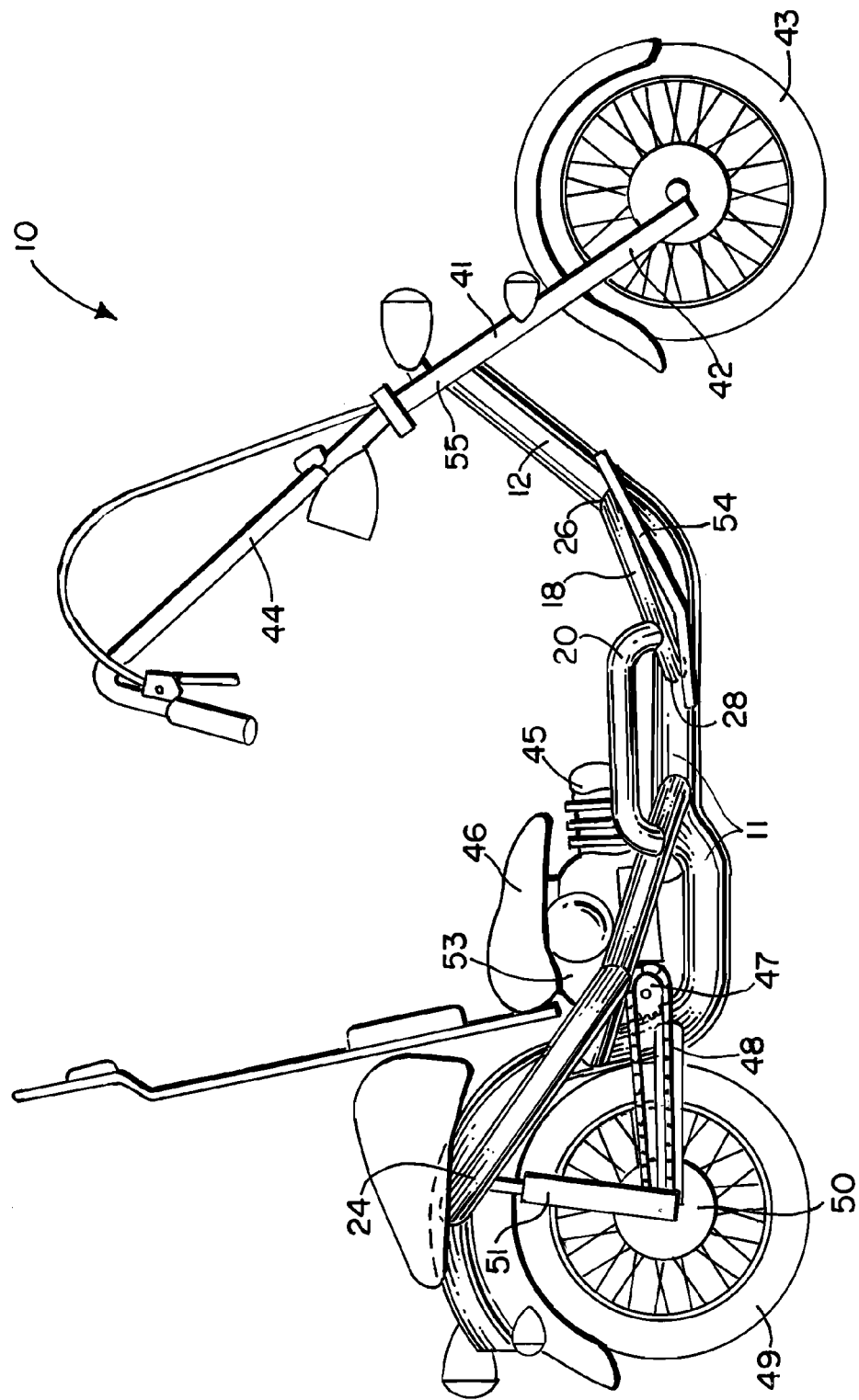
FIG. 1 is side view of a preferred embodiment of the apparatus of the present invention.

FIGS. 1-4 show the preferred embodiment of the apparatus of the present invention designated generally by the numeral 10. Motorcycle 10 provides a frame 11 (e.g. welded metal construction) that has an elongated center tube or tubing member 12 of a first diameter that is preferably a larger diameter. Center tube 12 has a front end portion 13 and rear end portion 14. Center tube 12 is preferably hollow, providing a bore 15 that can be open-ended. The bore 15 provides an internal diameter 16.

Pairs of laterally extending shorter tube sections 17-24 are attached to the elongated center tube 12. The plurality of pairs of laterally extending shorter tube sections are attached to the center tube 12 (e.g. welded) at intervals as shown in FIGS. 1-3. The lateral tube sections include sections 17, 18 that are next to front end portion 13 of center tube 12. The lateral tube sections also include tube sections 19, 20 and 21, 22 that are positioned nearer the mid portion of tube 12 and in between front end portion 13 and rear end portion 14. The lateral tube sections can also include tube sections 23, 24 that are positioned next to rear end portion 14 of center tube 12 as shown in FIG. 3.

The center tube 12 has numerous bends. These bends provide a geometry that enables mounting of a steering assembly 41 (see FIGS. 1-3), an engine 45 (see FIGS. 1-3), and a rear wheel 49 with shock or shocks 51 (see FIG. 1).

Various attachments, welds, or other suitable connections (preferably welded connections) 25-38 are provided for joining a lateral tube section 17-24 to center tube 12 or to other lateral tube sections. For example, tube section 17 is attached to center tube 12 at welds 25, 27. Tube section 18 attaches to center tube 12 at welds 26, 28. Tube section 21 attaches to center tube 12 at welds 33, 37 while tube section 22 attaches to center tube 12 at welds 34, 38.

In the case of tube sections 17, 18, 21, 22, they are attached only to center tube 12. However, tube sections 19, attach to lateral tube sections as shown. In FIG. 3, tube section 19 attaches to lateral tube section 17 at weld 29 and to lateral tube section 21 at weld 31. Similarly, tube section 20 attaches to tube section 18 at weld 30 and to tube section 22 at weld 32.

Tube section 23 is attached (at weld 39) to both center tube 12 and a laterally extended tube section 21 at weld 35. Similarly, tube section 24 attaches at weld 40 to center tube 12 and at weld 36 to tube section 22.

The steering assembly 41 provides fork 42 and front wheel 43 mounted thereto. Handle bars 44 are attached to the upper end portion of the steering assembly 41 as shown in FIGS. 1-2. Fork 41 can be mounted to the front end portion 13 of center tube 12 using a steering tube 55 or other pivotal connection or known arrangement for joining a fork to a frame on a motorcycle or scooter.

Seat 46 can be mounted above engine 45 but can also be supported in part by tube sections 21, 22, 23, 24. Engine 45 attaches to center tube 12 next to tube sections 21, 22, 23, 24.

Fuel is supplied to engine with fuel tank 53 that can be next to engine 45 or behind seat 46. The tube sections 21, 22 can be used to support engine 45 and to provide a guard that protects the engine 45, its sprocket 47 and chain 48.

Chain 48 can be used to drive wheel sprocket 50 and thus rear wheel 49 in a manner known in the art. Rear shock 51 can extend between rear wheel 49 and tube section 24. Tube sections 17, 18, 19, 20 can be used to support a floor panel 54 for receiving the feet of a user. Tube sections 17, 18 can protectively guard a brake pedal 52.

Figure 4:
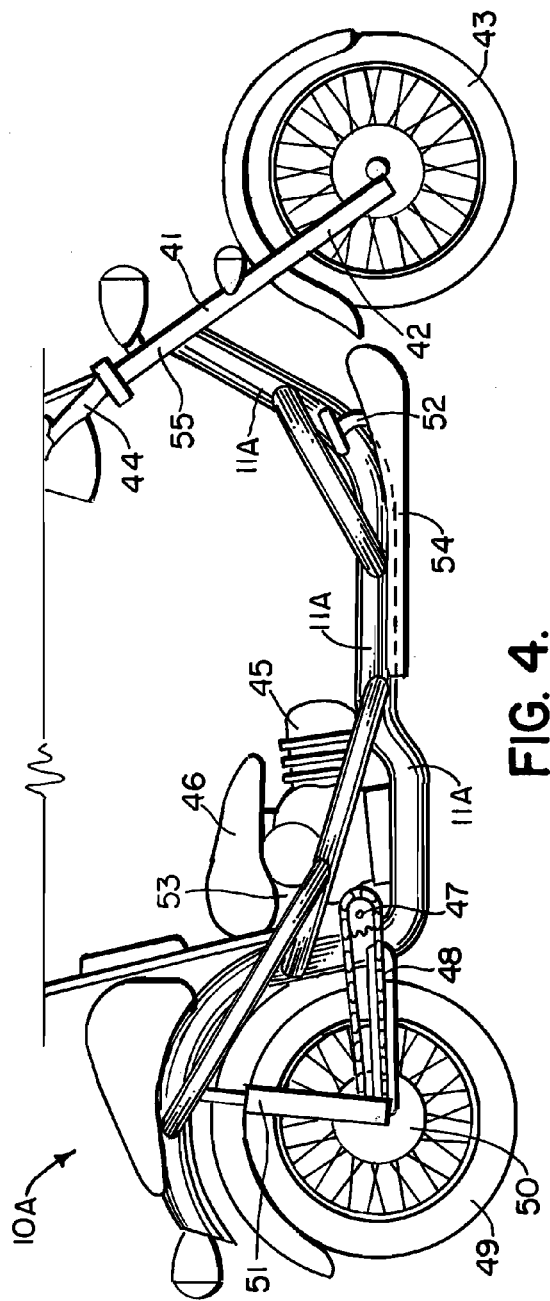
FIG. 4 is a side, perspective view of a preferred embodiment of the apparatus of the present invention.
Figure 5:
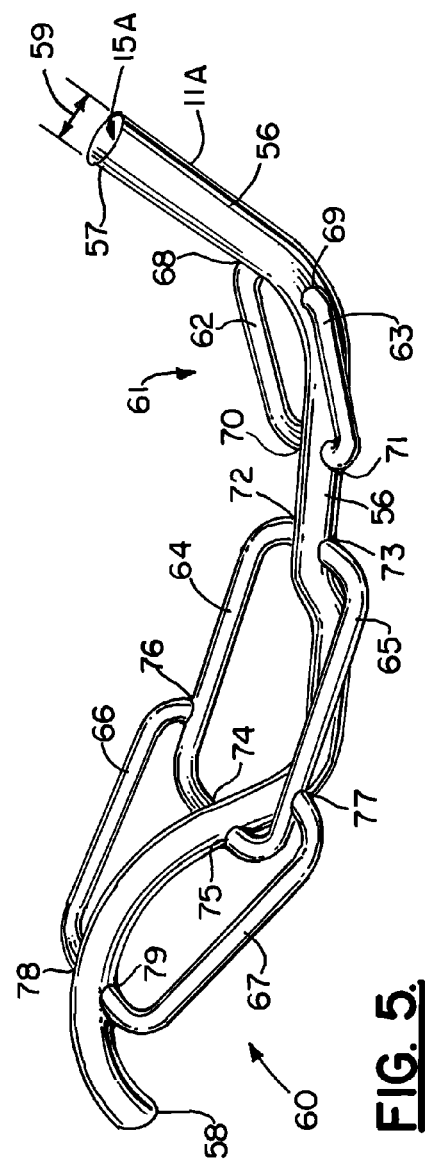
FIG. 5 is a partial perspective view of the preferred embodiment of the apparatus of the present invention illustrating the frame design.

FIGS. 4 and 5 show an alternate embodiment of the apparatus of the present invention designated generally by the numeral 10A. Motorcycle 10A provides a frame 11A having a center tube 56 with a hollow bore 15A. The center tube 56 has a front end portion 57 and a rear end portion 58. Arrow 59 in FIG. 5 denote a bore diameter. In each of the embodiments of FIGS. 1-3 and 4-5, a first concavity 60 is defined by center tube 12 or 56 at the rear end portion of the center tube 12 or 56 as shown in FIGS. 3 and 5. The concavity 60 is shaped to receive the rear wheel 49. The concavity 61 provides an unobstructed leg space above the foot rest or floor panel portion 54. This feature enables a user to occupy the seat 46 and easily swing his or her legs into the upwardly facing concavity 61, placing his or her feet upon the foot rest 54. In the alternate embodiment of FIG. 5, a plurality of laterally extending short tube sections 62-67 are provided including a front pair 62, 63, a middle pair 64, 65, and a rear pair 66, 67. As with the preferred embodiment, attachments (preferably welded attachments) can be used to join the tube sections 62, 67 to the center tube 56. It should be understood however that other materials could be used to construct frame 11 or 11A such as composite materials wherein welding would not be employed. Composite materials for use in the construction of a frame are well known.

Tube section 62 attaches to center tube 56 at attachments (for example, welds) 68, 70 if a steel or other weldable metal construction is used to center tube 56. Similarly, tube section 63 attaches at welds 69, 71 to center tube 56. In like manner, tube section 64 attaches to tube section 56 at welds 72, 74. Tube section 65 attaches to center tube 56 at welds 73, 75.

The rear pair of tube sections 66, 67 are attached at welds 78, 79 respectively to center tube 56. However, the tube sections 66, 67 also attach to other tube sections. The tube section 66 attaches at weld 76 to tube section 64. The tube section 67 attaches at weld 77 to tube section 65.

Figure 6:
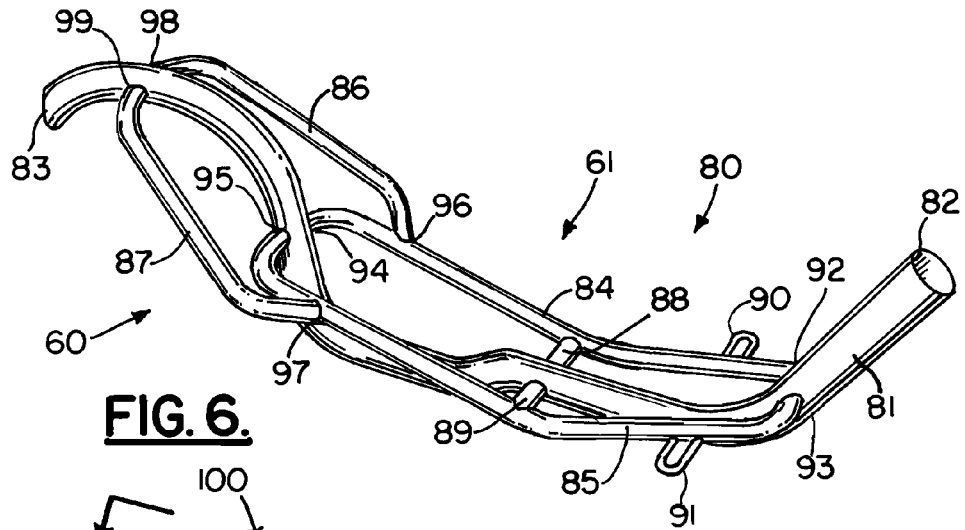
FIG. 6 is a partial perspective view of the preferred embodiment of the apparatus of the present invention illustrating an alternate frame design.
Figure 7:
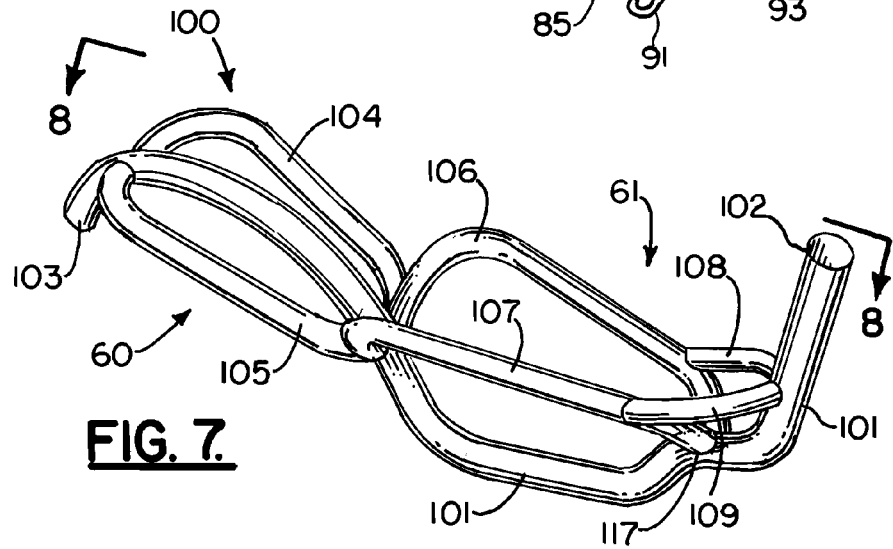
FIGS. 7-8 are partial perspective views of the preferred embodiment of the apparatus of the present invention showing another alternate frame design.
Figure 8:
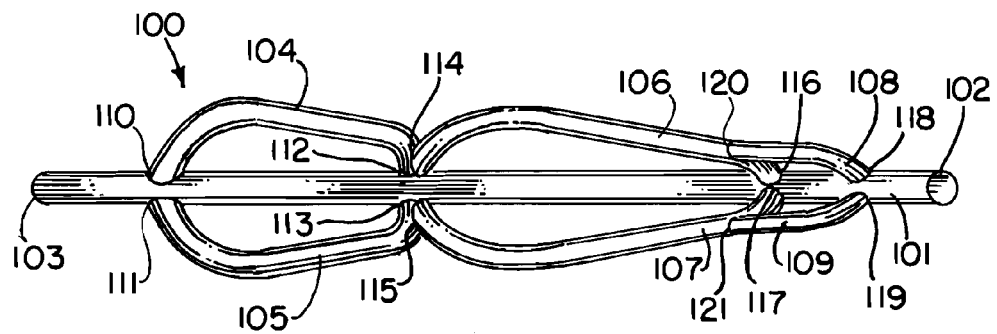
Figure 9:
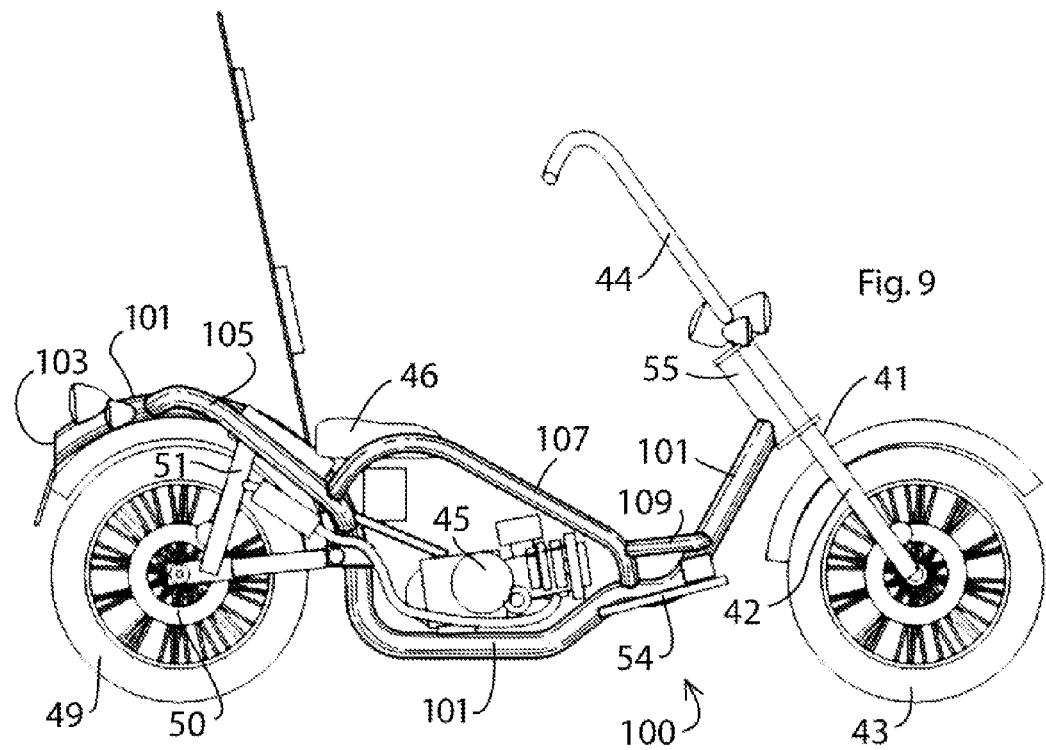
FIG. 9 is a side view of an alternate embodiment of the apparatus of the present invention utilizing the frame of FIGS. 7 and 8.

FIGS. 6-8 show alternate arrangements for frames that can be used to construct a motorcycle 10 or 10A. In FIG. 6, frame 80 is shown. FIGS. 7 and 8 and 9-20 show frame 100. In each of the frames 80, 100 there is provided a rear, downwardly facing concavity 60 and a forward, upwardly facing concavity 61 as with the embodiments of FIGS. 1-5.

In FIG. 6, frame 80 provides a center tube 81 with a front end portion 82 and a rear end portion 83. A plurality of tube sections 84-87 are provided. The forward tube sections 84, 85 are attached to center tube 81. The tube section 84 attaches to center tube 81 at welds 92, 94. The tube section 85 attaches to center tube 81 at welds 93, 95.

Struts 88, 89 can be used to form an attachment between each of the tube sections 84, 85 and at a position about midway in between the end portions of each tube section 84, 85. A rear pair of tube sections 86, 87 is attached, first to the center tube 81 at welds 98, 99 respectively.

The tube section 86 attaches to the tube section 84 at weld 96. The tube section 87 attaches at weld 97 to tube section 85.

Frame 80 provides foot rests 90, 91 that are attached to the respective tube sections 84, 85 as shown in FIG. 6.

In FIGS. 7 and 8, frame 100 has a center tube 101 with a front end portion 102 and a rear end portion 103. In FIGS. 7 and 8, three pairs of tube sections are provided. These include a rear pair of tube sections 104, 105 that are attached to center tube 101. The tube section 104 attaches to center tube 101 at welds 110, 112. The tube section 105 attaches to center tube 101 at welds 111, 113.

A center pair of tube sections 106, 107 is provided. The tube section 106 attaches to center tube 101 at weld 116. The tube section 107 attaches to center tube 101 at weld 117. Tube section 106 attaches to both tube section 104 and tube section 106 at weld 114. Similarly, tube section 107 attaches to center tube 101 and tube section 105 at weld 115. Tube section 108 attaches at weld 118 to center tube 101. Tube section 109 attaches at weld 119 to center tube 101. Tube section 108 attaches at weld 120 to tube section 106. Tube section 109 attaches at weld 121 to tube section 107.

Figure 10:
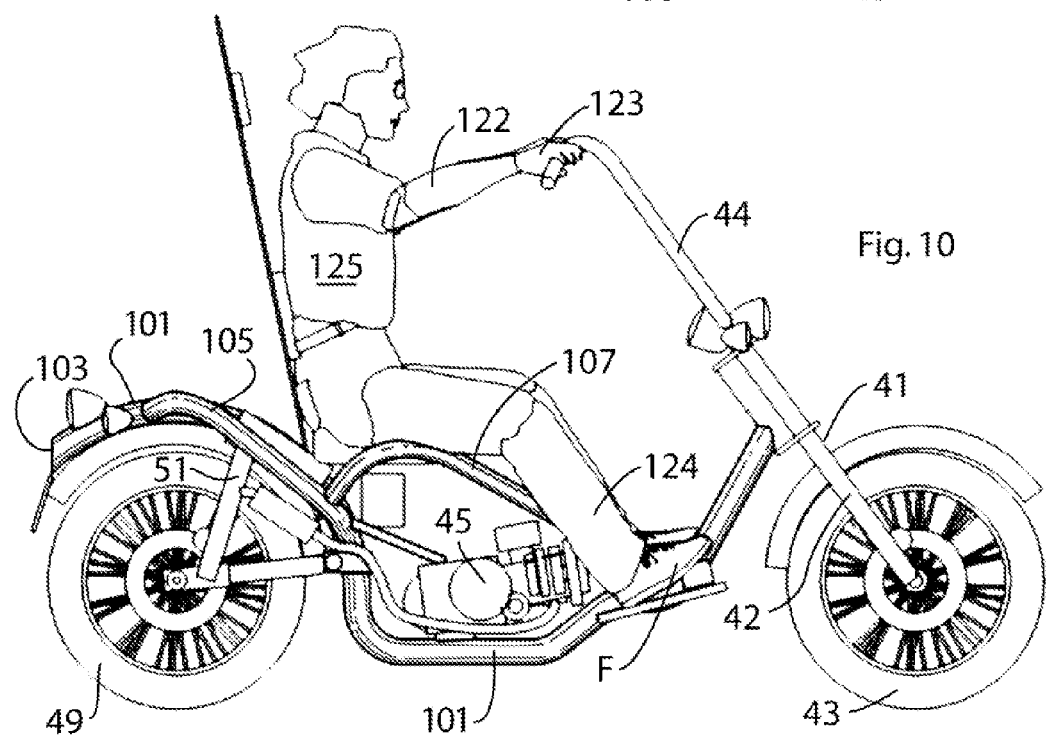
FIG. 10 is a side view of an alternate embodiment of the apparatus of the present invention utilizing the frame of FIGS. 7 and 8.
Figure 14:
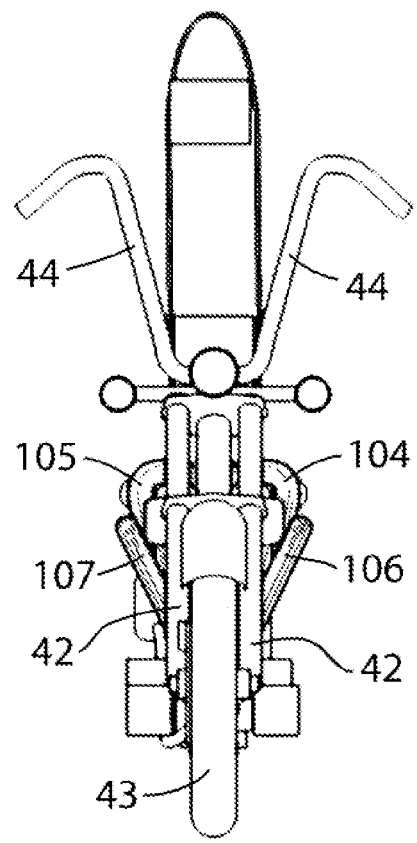
FIG. 14 is a front view of an alternate embodiment of the apparatus of the present invention utilizing the frame of FIGS. 7 and 8.
Figure 15:
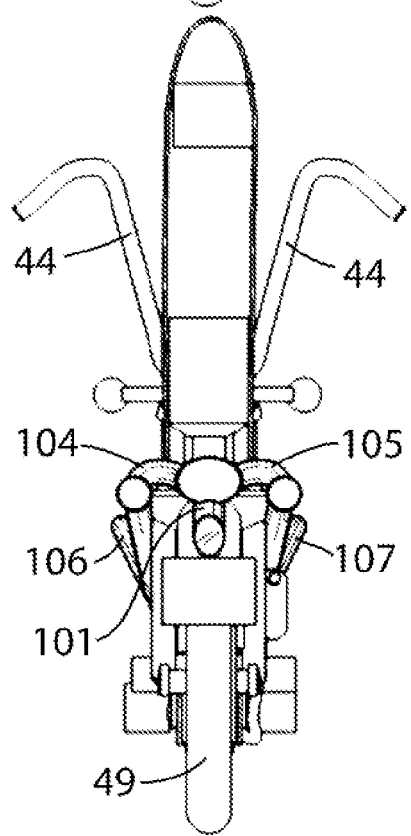
FIG. 15 is a rear view of an alternate embodiment of the apparatus of the present invention utilizing the frame of FIGS. 7 and 8.
Figure 16:
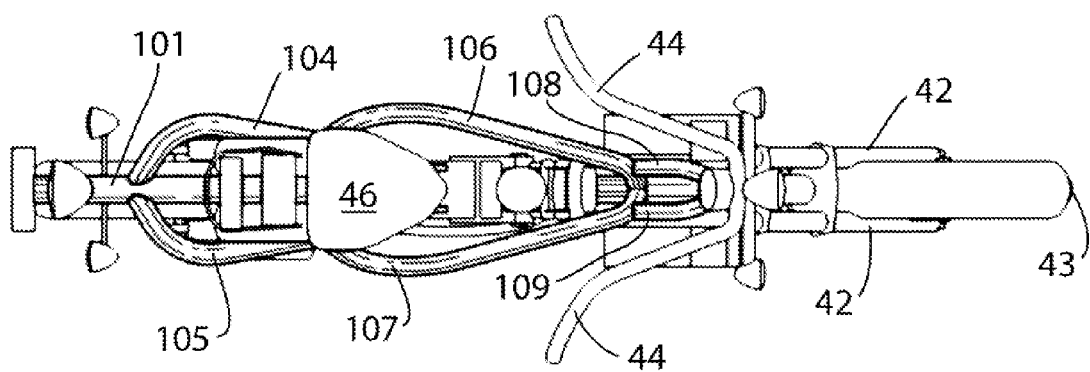
FIG. 16 is a top view of an alternate embodiment of the apparatus of the present invention utilizing the frame of FIGS. 7 and 8.
Figure 17:
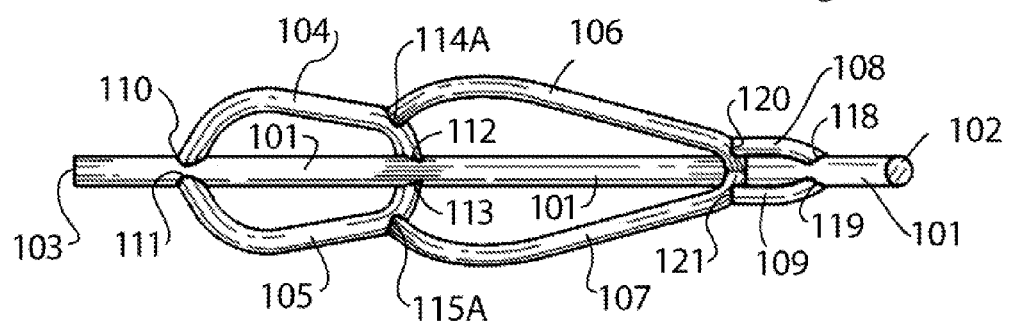
FIG. 17 is a fragmentary top view of an alternate embodiment of the apparatus of the present invention, showing the frame.
Figure 18:
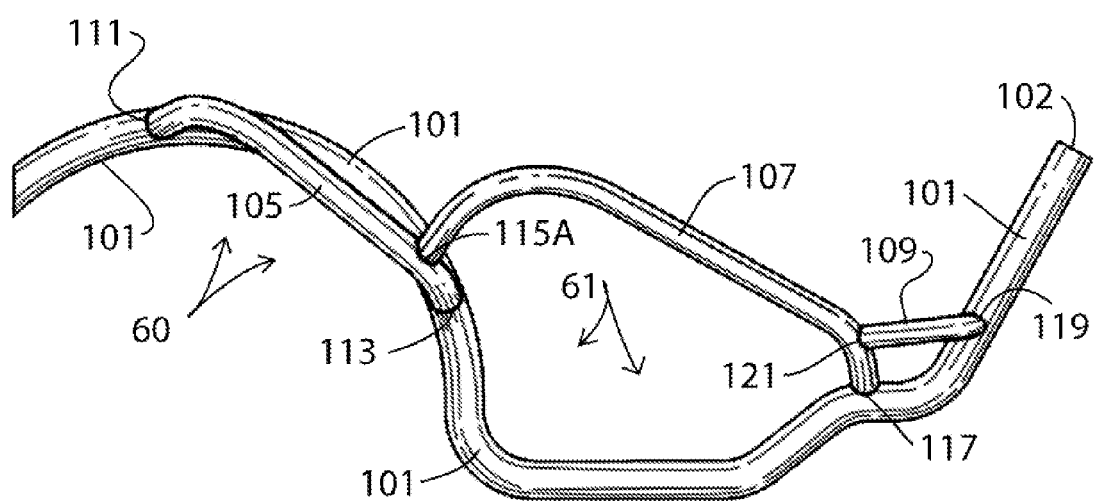
FIG. 18 is a fragmentary side view of an alternate embodiment of the apparatus of the present invention, showing the frame.
Figure 19:
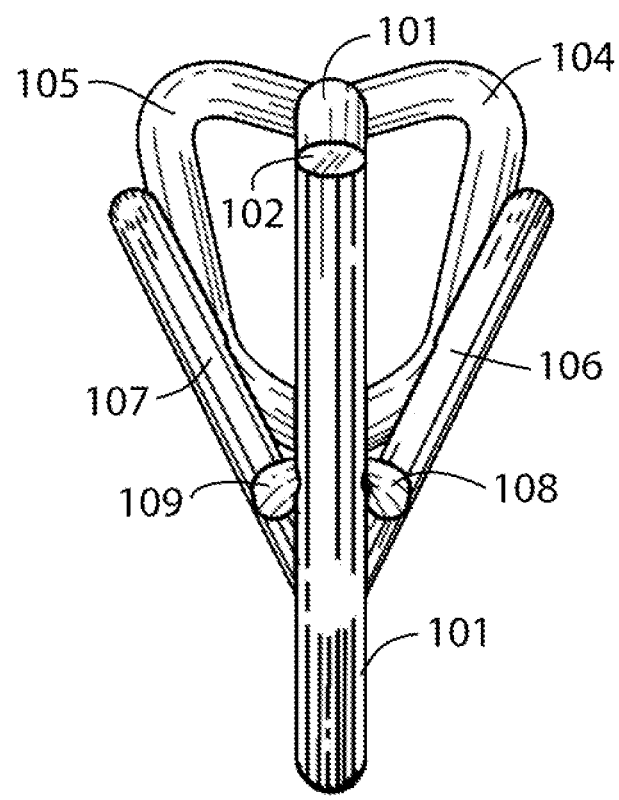
FIG. 19 is a fragmentary rear view of an alternate embodiment of the apparatus of the present invention, showing the frame.
Figure 20:
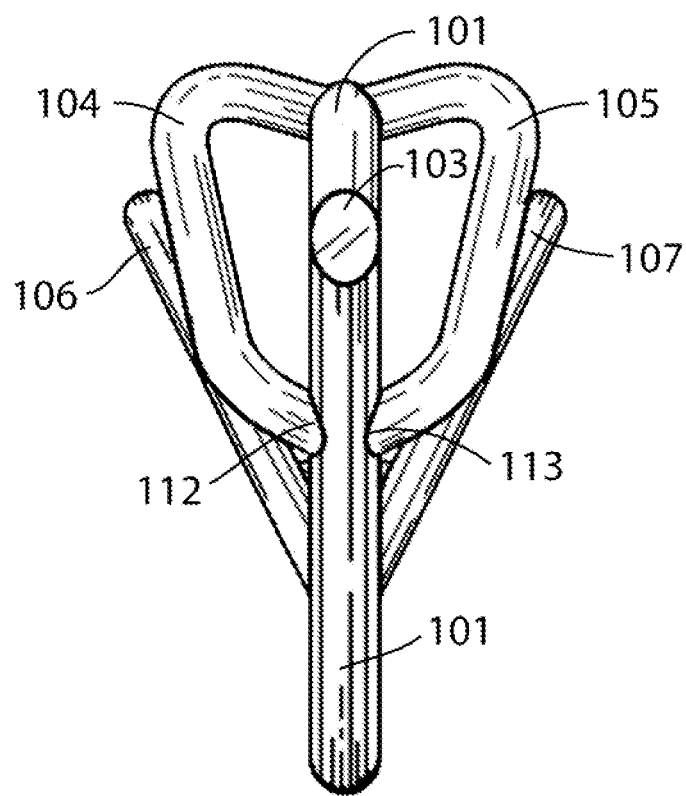
FIG. 20 is a fragmentary front view of an alternate embodiment of the apparatus of the present invention, showing the frame.

FIGS. 9-12 and 14-16 show the frame 100 of FIGS. 7-8 with components affixed. In FIG. 10, a rider 125 occupies seat 46, with arms 122 outstretched to enable hands 123 to grip handle bars 44. The rider's legs 124 extend downwardly to rest upon foot rest 54.

In FIGS. 13 and 17-20, the frame 100 is configured like the frame 100 of FIGS. 7-8, with welds 114A, 115A optionally attaching tubing sections 106, 107 respectively to tubing sections 104, 105 as shown. The only difference between FIGS. 7-8 when compared to FIGS. 9-20 is that in FIGS. 7-8 welds 114, 115 attach tubing sections 106, 107 respectively to the tubing sections 104, 105 as well as to center tube 101 as shown.

The following is a list of parts and materials suitable for use in the present invention:

| Parts Number | PARTS LIST Description |
|---|---|
| 10 | motorcycle |
| 10A | motorcycle |
| 11 | frame |
| 11A | frame |
| 12 | center tube |
| 13 | front end portion |
| 14 | rear end portion |
| 15 | bore |
| 15A | bore |
| 16 | diameter |
| 17 | lateral tube section |
| 18 | lateral tube section |
| 19 | lateral tube section |
| 20 | lateral tube section |
| 21 | lateral tube section |
| 22 | lateral tube section |
| 23 | lateral tube section |
| 24 | lateral tube section |
| 25 | attachment |
| 26 | attachment |
| 27 | attachment |
| 28 | attachment |
| 29 | attachment |
| 30 | attachment |
| 31 | attachment |
| 32 | attachment |
| 33 | attachment |
| 34 | attachment |
| 35 | attachment |
| 36 | attachment |
| 37 | attachment |
| 38 | attachment |

-continued

PARTS LIST

| Parts Number | Description |
|---|---|
| 39 | attachment |
| 40 | attachment |
| 41 | steering assembly |
| 42 | fork |
| 43 | front wheel |
| 44 | handlebars |
| 45 | engine |
| 46 | seat |
| 47 | drive sprocket |
| 48 | chain |
| 49 | rear wheel |
| 50 | wheel sprocket |
| 51 | rear shock |
| 52 | brake pedal |
| 53 | fuel tank |
| 54 | floor panel |
| 55 | steering tube (pivotal connection) |
| 56 | center tube |
| 57 | front end portion |
| 58 | rear end portion |
| 59 | bore diameter |
| 60 | concavity |
| 61 | concavity |
| 62 | tube section |
| 63 | tube section |
| 64 | tube section |
| 65 | tube section |
| 66 | tube section |
| 67 | tube section |
| 68 | attachment |
| 69 | attachment |
| 70 | attachment |
| 71 | attachment |
| 72 | attachment |
| 73 | attachment |
| 74 | attachment |
| 75 | attachment |
| 76 | attachment |
| 77 | attachment |
| 78 | attachment |
| 79 | attachment |
| 80 | frame |
| 81 | center tube |
| 82 | front end portion |
| 83 | rear end portion |
| 84 | tube section |
| 85 | tube section |
| 86 | tube section |
| 87 | tube section |
| 88 | strut |
| 89 | strut |
| 90 | foot rest |
| 91 | foot rest |
| 92 | attachment |
| 93 | attachment |
| 94 | attachment |
| 95 | attachment |
| 96 | attachment |
| 97 | attachment |
| 98 | attachment |
| 99 | attachment |
| 100 | frame |
| 101 | center tube |
| 102 | front end portion |
| 103 | rear end portion |
| 104 | tube section |
| 105 | tube section |
| 106 | tube section |
| 107 | tube section |
| 108 | tube section |
| 109 | tube section |
| 110 | attachment |
| 111 | attachment |
| 112 | attachment |
| 113 | attachment |

-continued

PARTS LIST

| Parts Number | Description |
|---|---|
| 114 | attachment |
| 114A | attachment |
| 115 | attachment |
| 115A | attachment |
| 116 | attachment |
| 117 | attachment |
| 118 | attachment |
| 119 | attachment |
| 120 | attachment |
| 121 | attachment |
| 122 | arm |
| 123 | hand |
| 124 | leg |
| 125 | rider |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A motorcycle, comprising:
  a) a frame that includes a single center tubing member that has front and rear end portions, a lower part in between the front and rear portions, the single center tubing member having an overall length and occupying a plane;
  b) a plurality of laterally extending tube sections that each have a length that is shorter than the length of the center tubing member, each shorter tube section having first and second ends that connect to the center tubing member at spaced apart positions;
  c) wherein said laterally extending tube sections include a first and a second plurality of the shorter tube sections, said first plurality being connected to the center tube at a position in front of the second plurality of the shorter tube sections, each plurality of shorter tube sections including a pair of shorter tube sections connected to the opposing sides of the center tubing member;
  d) a steering assembly that includes a front fork, the steering assembly being pivotally attached to the front end portion of the center tube at a provided pivotal connection;
  e) a front wheel attached to the front fork;
  f) handlebars attached to the steering assembly;
  g) a rear wheel connected to the frame behind the lower part of the center tubing member;
  h) a shock absorber that extends between the rear wheel and one of the lateral tubes; and
  i) the frame supporting a plurality of components that include an engine that sits atop the lower part of the center tube, a seat that is supported by the frame at a position next to the rear end portion of the center tube and a fuel tank for supplying fuel to the engine.

2. The motorcycle of claim 1 wherein some of the lateral tube sections are positioned in front of the engine.

3. The motorcycle of claim 1 wherein a pair of the lateral tube sections are positioned in front of the engine and on opposite sides of the center tube.

4. The motorcycle of claim 1 wherein some of the lateral tube sections extend from a position next to the engine to a position next to the rear wheel.

5. The motorcycle of claim 1 wherein a pair of the lateral tube sections extend from a position next to the engine to a position next to the rear wheel.

6. The motorcycle of claim 1 wherein the center tubing member has a plurality of bends including a front bend behind the front wheel and in front of the engine, at least one center bend next to the engine and a rear bend that is next to the rear wheel.

7. The motorcycle of claim 1 wherein the center tubing member has a plurality of bends including a front bend behind the front wheel and in front of the engine, at least one center bend next to the engine and a rear bend that generally tracks the curvature of the rear wheel.

8. The motorcycle of claim 1 wherein the frame includes multiple pairs of lateral tube sections, each pair comprising opposed lateral tube sections that connect to the center tubing member at opposing positions.

9. The motorcycle of claim 8 wherein the frame includes a pair of lateral tube sections that connect to the center tubing member at a position that is next to the front end portion of the center tubing member.

10. The motorcycle of claim 8 wherein the frame includes a pair of lateral tube sections that connect to the center tubing member at a position next to the rear end portion of the center tubing member.

11. The motorcycle of claim 8 wherein the frame includes three pairs of lateral tube sections.

12. The motorcycle of claim 11 wherein the frame includes a pair of lateral tube sections that connect to the center tubing member at a position that is next to the front end portion of the center tubing member.

13. The motorcycle of claim 11 wherein the frame includes a pair of lateral tube sections that connect to the center tubing member at a position next to the rear end portion of the center tubing member.

14. The motorcycle of claim 11 wherein the frame includes a pair of lateral tube sections that connect to the center tubing member at a position in front of the engine and next to the rear wheel and a pair of lateral tube sections that connect to the center tubing member above the rear wheel and to other lateral tube sections at positions next to the engine.

15. A motorcycle, comprising:
   a) a frame that includes a hollow center tube that has front and rear end portions, a lower part in between the front and rear portions, the center tube having an overall length and occupying a plane;
   b) a plurality of hollow laterally extending tubes that each have a length that is shorter than the length of the center tube, each shorter tube having first and second ends that connect to the larger tube at spaced apart positions;
   c) wherein said laterally extending tubes include a first and a second plurality of the shorter tubes, said first plurality including a pair of shorter tubes that are connected to the center tube on opposite sides of the center tube and at a position in front of the second plurality of the shorter tubes;
   d) a steering assembly that includes a front fork, the steering assembly being pivotally attached to the front end portion of the center tube;
   e) a front wheel attached to the front fork;
   f) handlebars attached to the steering assembly;
   g) a rear wheel connected to the frame behind the lower part of the center tube;
   h) a shock absorber that extends between the rear wheel and one of the lateral tubes; and
   i) the frame supporting a plurality of components that include an engine that sits atop the lower part of the center tube, a seat that is supported by the frame at a position next to the rear end portion of the center tube and a fuel tank for supplying fuel to the engine.

16. A motorcycle, comprising:
   a) a frame that includes a center tubing member that has front and rear end portions, a lower part in between the front and rear portions, the center tubing member having an overall length and occupying a generally vertical plane;
   b) a plurality of laterally extending tube sections that each have a length that is shorter than the length of the center tubing member, at least two pairs of the shorter tube sections having first and second ends that connect to the center tubing member at spaced apart positions, and wherein each pair of shorter tube sections extend in opposite directions from the center tubing member;
   c) wherein said laterally extending tube sections include a first and a second plurality of the shorter tube sections, said first plurality being connected to the center tube at a position in front of the second plurality of the shorter tube sections;
   d) a steering assembly that includes a front fork, the steering assembly being pivotally attached to the front end portion of the frame at a provided pivotal connection;
   e) a front wheel attached to the front fork;
   f) handlebars attached to the steering assembly;
   g) a rear wheel connected to the frame behind the lower part of the center tubing member;
   h) at least one shock absorber that extends between the rear wheel and the frame;
   i) the frame supporting a plurality of components that include an engine that sits atop the lower part of the center tube, a seat that is supported by the frame at a position next to the rear end portion of the center tube and a fuel tank for supplying fuel to the engine.

17. The motorcycle of claim 16 wherein some of the lateral tube sections are positioned in front of the engine.

18. The motorcycle of claim 16 wherein a pair of the lateral tube sections are positioned in front of the engine and on opposite sides of the center tube.

19. The motorcycle of claim 16 wherein some of the lateral tube sections extend from a position next to the engine to a position next to the rear wheel.

20. The motorcycle of claim 16 wherein a pair of the lateral tube sections extend from a position next to the engine to a position next to the rear wheel.

21. The motorcycle of claim 16 wherein the center tubing member has a plurality of bends including a front bend behind the front wheel and in front of the engine, at least one center bend next to the engine and a rear bend that is next to the rear wheel.

22. The motorcycle of claim 16 wherein the center tubing member has a plurality of bends including a front bend behind the front wheel and in front of the engine, at least one center bend next to the engine and a rear bend that generally tracks the curvature of the rear wheel.

23. The motorcycle of claim 16 wherein the frame includes multiple pairs of lateral tube sections, each pair comprising opposed lateral tube sections that connect to the center tubing member at opposing positions.

24. The motorcycle of claim 23 wherein the frame includes a pair of lateral tube sections that connect to the center tubing member at a position that is next to the front end portion of the center tubing member.

25. The motorcycle of claim 23 wherein the frame includes a pair of lateral tube sections that connect to the center tubing member at a position next to the rear end portion of the center tubing member.

26. The motorcycle of claim 23 wherein the frame includes three pairs of lateral tube sections.

27. The motorcycle of claim 26 wherein the frame includes a pair of lateral tube sections that connect to the center tubing member at a position that is next to the front end portion of the center tubing member.

28. The motorcycle of claim 26 wherein the frame includes a pair of lateral tube sections that connect to the center tubing member at a position next to the rear end portion of the center tubing member.

29. The motorcycle of claim 26 wherein the frame includes a pair of lateral tube sections that connect to the center tubing member at a position in front of the engine and next to the rear wheel and a pair of lateral tube sections that connect to the center tubing member above the rear wheel and to other lateral tube sections at positions next to the engine.

30. A motorcycle, comprising:
   a) a frame that includes a center tube that has front and rear end portions, an upwardly facing concave part next to the front end portion, and a downwardly facing concave part next to the rear end portion, the center tube having an overall length and;
   b) one or more laterally extending tubes that each have a length that is shorter than the length of the center tube, at least one of the shorter tubes having first and second ends that connect to the larger tube at spaced apart positions;
   c) a steering assembly that includes a front fork, the steering assembly being pivotally attached to the front end portion of the center tube;
   d) a front wheel attached to the front fork;
   e) handlebars attached to the steering assembly;
   f) a rear wheel connected to the frame behind the upwardly facing concave part and under the downwardly facing concave part of the center tube;
   g) a shock absorber that extends between the rear wheel and the frame; and
   h) the frame supporting a plurality of components that include an engine that sits atop the lower part of the center tube next to the upwardly facing concave portion, a seat that is supported by the frame at a position next to the engine and a fuel tank one the frame for supplying fuel to the engine.

31. The motorcycle of claim 30 wherein some of the lateral tubes are positioned in front of the engine.

32. The motorcycle of claim 30 wherein a pair of the lateral tubes are positioned in front of the engine and on opposite sides of the center tube.

33. The motorcycle of claim 30 wherein some of the lateral tubes extend from a position next to the engine to a position next to the rear wheel.

34. The motorcycle of claim 30 wherein a pair of the lateral tubes extend from a position next to the engine to a position next to the rear wheel.

35. The motorcycle of claim 30 wherein the center tube has a plurality of bends including a front bend behind the front wheel and in front of the engine, at least one center bend next to the engine and a rear bend that is next to the rear wheel.

36. The motorcycle of claim 30 wherein the center tube has a plurality of bends including a front bend behind the front wheel and in front of the engine, at least one center bend next to the engine and a rear bend that generally tracks the curvature of the rear wheel.

37. The motorcycle of claim 30 wherein the frame includes multiple pairs of lateral tubes, each pair comprising opposed lateral tubes that connect to the center tube at opposing positions.

38. The motorcycle of claim 37 wherein the frame includes a pair of lateral tubes that connect to the center tube at a position that is next to the front end portion of the center tube.

39. The motorcycle of claim 37 wherein the frame includes a pair of lateral tubes that connect to the center tube at a position next to the rear end portion of the center tube.

40. The motorcycle of claim 30 wherein the frame includes three pairs of lateral tubes.

41. The motorcycle of claim 30 wherein the frame includes a pair of lateral tubes that connect to the center tube at a position that is next to the front end portion of the center tube.

42. The motorcycle of claim 40 wherein the frame includes a pair of lateral tubes that connect to the center tube at a position next to the rear end portion of the center tube.

43. The motorcycle of claim 40 wherein the frame includes a pair of lateral tubes that connect to the center tube at a position in front of the engine and next to the rear wheel and a pair of lateral tubes that connect to the center tube above the rear wheel and to other lateral tubes at positions next to the engine.

44. The motorcycle of claim 30 wherein the upwardly facing concavity has a foot rest portion in front of the engine.

45. The motorcycle of claim 44 wherein there is an unobstructed leg space above the foot rest portion.

* * * * *